May 3, 1966 A. STAPRANS ET AL 3,249,794

HIGH FREQUENCY TUBE METHOD AND APPARATUS

Original Filed Aug. 6, 1959 2 Sheets-Sheet 1

*INVENTORS*
ARMAND STAPRANS
GEORGE CARYOTAKIS

*BY* Harry E. Aine
ATTORNEY

HIGH FREQUENCY TUBE METHOD AND APPARATUS
Original Filed Aug. 6, 1959 2 Sheets-Sheet 2
FIG. 5
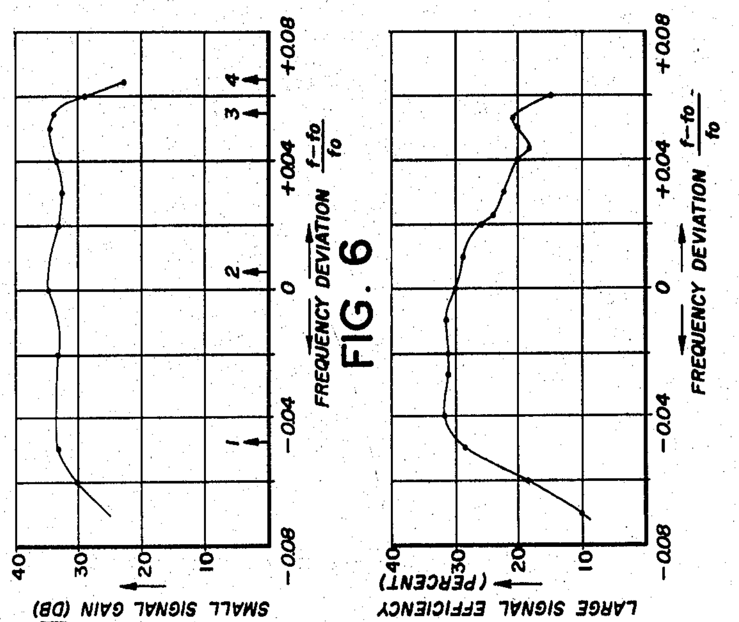
FIG. 6
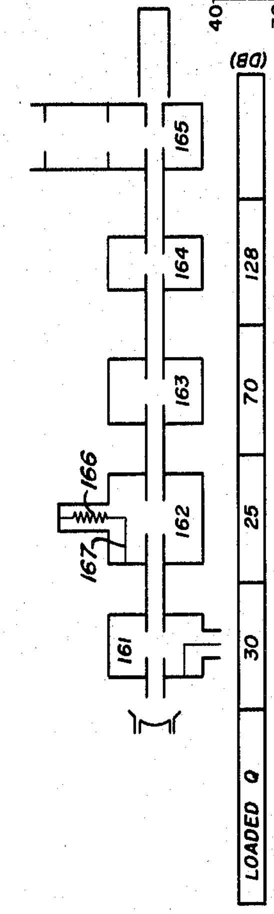
FIG. 3
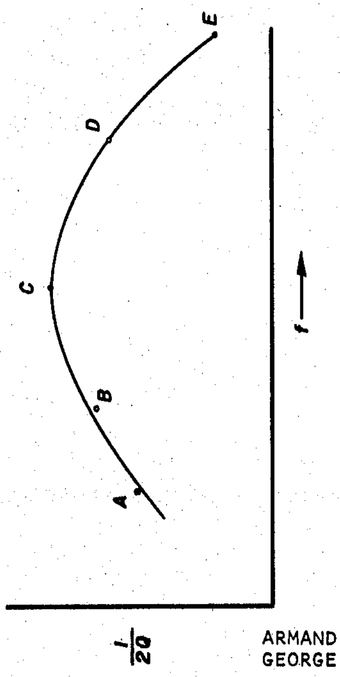
FIG. 4
INVENTORS
ARMAND STAPRANS
GEORGE CARYOTAKIS
BY Harry E. Aine
ATTORNEY United States Patent Office 3,249,794
Patented May 3, 1966

3,249,794
HIGH FREQUENCY TUBE METHOD AND APPARATUS

Armand Staprans, Mountain View, and George Caryotakis, Los Altos, Calif., assignors to Varian Associates, Palo Alto, Calif., a corporation of California Original application Aug. 6, 1959, Ser. No. 832,402, now Patent No. 3,169,206, dated Feb. 9, 1965. Divided and this application Aug. 29, 1962, Ser. No. 220,326
2 Claims. (Cl. 315—5.43)

Figures 1, 2:
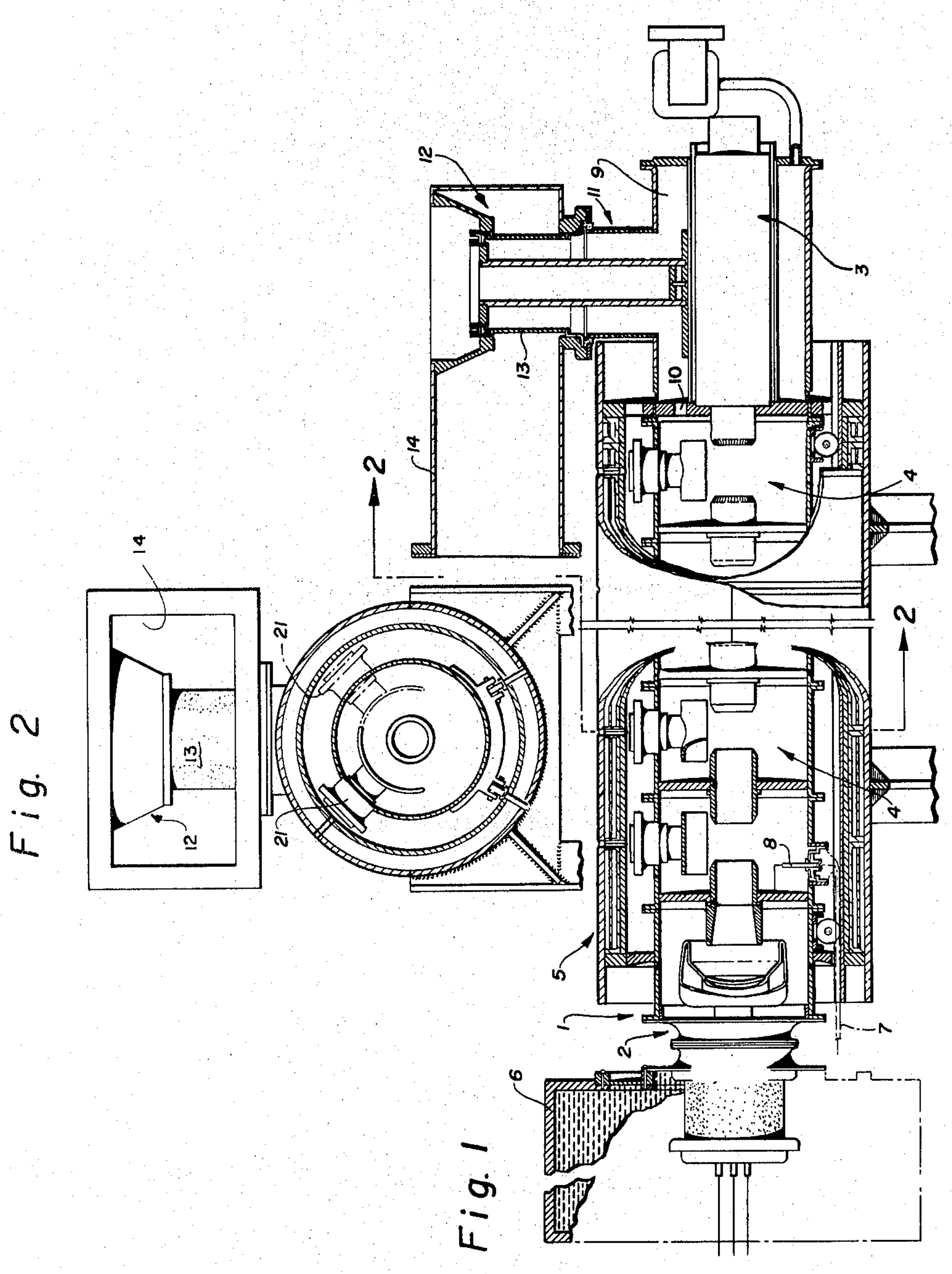

The present invention is a divisional application of copending application Serial No. 832,402, filed August 6, 1959, now issued as U.S. Patent No. 3,169,206 on February 9, 1965, and relates in general to high frequency tubes and more particularly to a novel high power, pulsed, UHF, broad band amplifier useful, for example, in applications as navigation and communication systems, as a driver for a linear accelerator, and the like.

The tube of the present invention is a fixed tuned five cavity UHF klystron amplifier having a half power bandwidth of approximately 12% to 14% with an R.F. efficiency of 32%. This tube is approximately eleven feet in length and including only the evacuated structure weighs approximately 700 pounds. The tube will deliver at UHF frequency 8 to 10 megawatts peak R.F. power with an average R.F. power of 30 kw.

The principal object of the present invention is to provide an improved high frequency klystron amplifier tube apparatus which is relatively simple of construction, relatively easy to handle, and which will have long operating life while delivering high peak and high average R.F. power.

One feature of the present invention is the provision of method and apparatus for broadbanding a fixed tuned multicavity klystron amplifier by preferentially lowering the Q's and stagger tuning the cavities in a certain manner whereby extremely broad band operation is obtained.

Other features and advantages of the present invention will become apparent upon a perusal of the following specification taken in connection with the accompanying drawings wherein, FIG. 1 is a longitudinal view, partly in section, showing the multicavity klystron amplifier apparatus of the present invention, FIG. 2 is a cross sectional view of the structure of FIG. 1 taken along line 2—2 in the direction of the arrows, FIG. 3 is a schematic diagram of a fixed tuned broadband klystron amplifier of the present invention depicting the preferential loading of the cavities, FIG. 4 is a graph of the reciprocal of cavity loading versus frequency for the klystron amplifier of FIG. 3, FIG. 5 is a graph of small signal gain versus frequency deviation of a broad band klystron amplifier tube apparatus of FIG. 3, and FIG. 6 is a graph of large signal efficiency in percent versus frequency deviation for the fixed tuned broad band klystron apparatus as depicted in FIG. 3.

Referring now to FIG. 1 there is shown a longitudinal partly cross sectional view of a high frequency high power multicavity klystron tube apparatus utilizing features of the present invention. More specifically, the tube comprises an elongated tubular metallic envelope 1 having an electron gun assembly 2 at one end thereof for producing and directing the beam of electrons axially through the elongated vacuum envelope 1 to an electron collector assembly 3 mounted at the other end of the elongated envelope 1. A plurality of cavity resonators 4 are provided between the cathode assembly 2 and the collector assembly 3 for successive electromagnetic interaction with the beam of electrons passable therethrough.

A beam focusing solenoid 5 envelopes the central portion of the tube's envelope for focusing the electron beam throughout the length of the tube apparatus. The free end portion of the cathode assembly 2 is inserted within an oil tank 6 and sealed therewithin via suitable mating flanges provided on the tube envelope 1 and the oil tank 6. The oil in the oil tank serves to prevent electrical breakdown across the high voltage anode to cathode insulator of the cathode assembly 2.

Electromagnetic energy which it is desired to have amplified by the tube is fed to the first cavity 4 of the tube via coaxial line 7 and input loop 8. This R.F. energy serves to velocity modulate the beam, such velocity modulation being transformed into current density modulation as the beam travels down the length of the tube. The current density modulation is further enhanced by successive cavities 4. The current density modulation serves to excite the last or output cavity 4. The greatly amplified R.F. output energy is extracted from the output cavity 4 via a suitable coupling iris 10 and hollow waveguide 9. The waveguide 9 is wrapped around the collector assembly 3. The output R.F. energy is extracted from the waveguide 9 via a coaxial line 11 and thence fed via a doorknob transition 12, having a cylindrical wave permeable window 13 vacuum sealed therein, to an output rectangular waveguide 14.

A five cavity fixed tuned broad band klystron amplifier model of the present invention utilizes a novel cavity tuning and loading method for obtaining enhanced bandwidth. The method constitutes another feature of the present invention. More specifically, referring now to FIG. 3, there is shown in schematic diagram from a five cavity klystron amplifier tube having four driving cavities 161, 162, 163 and 164. An output R.F. circuit 165, preferably of the coupled cavity type, serves to present a flat impedance at the output gap to the beam over the desired frequency band. In particular, the broadbanding method relates to the driver section and has to do with the proper selection of resonant frequencies and loaded Q's for the individual driving cavities.

It has been found that, in general, to obtain broad band response the poles of the driving cavities in the complex frequency plane should preferably lie in certain predetermined positions. Analysis of multicavity klystron amplifiers utilizing a complex frequency plane is taught in the following article: "A Study of the Broadband Frequency Response of the Multicavity Klystron Amplifier," by K. H. Kreuchen, B. A. Auld and N. E. Dixon in Journal of Electronics, vol. 2, pp. 529–567 (1957). If no zeros were present in the klystron response, then these poles should lie on a Tchebycheff ellipse. In practice, zeros will be found in the response, and therefore to counteract the effect of the zeros, the poles should be displaced from the ellipse in a certain manner as follows.

It has been found that with multicavity klystrons the best broad band results are obtained when the Q's and frequency of the cavities are arranged, starting from the lowest frequency cavity, with the loaded Q decreasing for each cavity successively higher in frequency until about the center of the frequency band after which the loaded Q increase gradually, the highest frequency cavity having the highest Q. The exact positions of the poles may be computed using the small-signal space-charged-wave theory as taught by Kruchen, Auld and Dixon in the above article.

A preferred distribution of loaded cavity Q versus frequency is indicated in FIG. 4, where letters A–E refer to individual driving cavities. Merely arranging the loaded Q's of the cavities with regard to frequency as indicated in FIG. 4 will provide a substantial increase in the bandwidth of the tube. However, even greater enhancement in the bandwidth may be obtained if the cavities are related to the poles in a certain manner. More specifically, it has been found that the bandwidth of a multicavity klystron utilizing short drift lengths between cavities as of, for example, less than 60° of reduced plasma frequency phase as defined by G. M. Branch et al. in General Electric Research Laboratory Report No. 55–RL–1181A, February 1955, can be increased if the input cavity 161 is chosen at the lowest frequency. Furthermore, it has been found that the efficiency of the klystron is substantially improved if the one or two cavities immediately preceding the output cavity are tuned to the high frequency end of the band. Since one of the intermediary cavities preferably has a very low Q as of, for example 25, the problem of selecting the cavity tunings is uniquely determined for a four cavity driver. Loading a cavity to a very low Q for this application is best accomplished by beam loading, i.e., making the gap length in the order of 1 to 3 radians of electronic drift angle at the operating frequency of the tube. If additional loading is desired, it may be obtained by coupling an additional external load to the cavity as indicated in FIG. 3.

In particular, the second cavity 162 is preferably chosen as the lowest Q cavity because external loading is more easily accomplished near the input cavity where the R.F. power is relatively low. The input cavity 161 is preferably tuned to the low end of the band to increase the bandwidth. The last one or two cavities 163 and 164 are preferably tuned to the high frequency end of the band to enhance efficiency. Generally, cavities with the lowest Q should be nearer to the input cavity. Thus for a five cavity klystron amplifier having four driving cavities, the preferred tuning arrangement is that the resonance frequency of the cavities should increase successively from the first cavity to the last driving cavity.

The five cavity fixed tuned tube model of the present invention having loaded Q's as indicated in FIG. 3 and resonant frequencies of the cavities as indicated by the arrows in FIG. 5 yielded the small signal gain in db versus frequency deviation curve as plotted in FIG. 5 and the large signal efficiency in percent versus frequency deviation curve as plotted in FIG. 6. From these curves it is easily seen that a 12% to 14% bandwidth was obtained.

The physical construction of the five cavity fixed tuned tube model of the present invention utilized the tuners 21 only for initially tuning the cavities to the frequencies as indicated in FIG. 5. External loading was provided for the second driver cavity as shown in FIG. 3.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a four-driver cavity klystron amplifier tube having the four-driver cavities arranged in numerical sequence in the order in which they interact with the beam and including, a first cavity tuned to a resonant frequency at the low end of the tube operating frequency band, second, third and fourth cavity resonators each successively tuned to higher frequencies, the fourth cavity resonator tuned to the highest frequency, and the second cavity having the lowest Q as loaded of the four-driver cavities whereby broadband operation is facilitated.

2. The method of tuning a multicavity beam amplifier having a plurality of successive driver cavities arranged along the beam path for broadband response comprising the steps of, distributing the resonant frequencies of the individual driver cavities over the desired operating band of frequencies, arranging the loaded Q's of the driver cavities, starting with the lowert frequency cavity, with a decreasing Q with increasing frequency, and continuing in this manner to an intermediate frequency cavity after which the loaded Q's of the cavities increase with increasing frequency, and tuning the individual driver cavities which are arranged along the beam from the beginning of the beam path toward the end of the beam path in an ascending order of frequency whereby broadband amplifier response is obtained.

References Cited by the Examiner

UNITED STATES PATENTS

| | | | |
|---|---|---|---|
| 2,224,200 | 12/1940 | Schiememann | 330—154 |
| 2,591,910 | 4/1952 | Barford | 315—5.43 |
| 2,934,672 | 4/1960 | Pollack et al. | 315—5.46 |

DAVID J. GALVIN, *Primary Examiner.*